E (12) United States Patent
White (10) Patent No.: US 8,991,448 B2
(45) Date of Patent: Mar. 31, 2015

(54) UNIVERSAL COVERING SYSTEM

(71) Applicant: Matthew White, Franklin, NH (US)

(72) Inventor: Matthew White, Franklin, NH (US)

( * ) Notice: Subject to any disclaimer, the term of this patent is extended or adjusted under 35 U.S.C. 154(b) by 302 days.

(21) Appl. No.: 13/625,901

(22) Filed: Sep. 25, 2012

(65) Prior Publication Data

US 2014/0083579 A1   Mar. 27, 2014

(51) Int. Cl.
*A61B 17/00* (2006.01)
*B60P 7/08* (2006.01)
*A44B 99/00* (2010.01)
*B60J 11/04* (2006.01)
*D06N 3/14* (2006.01)
*F16B 5/06* (2006.01)

(52) U.S. Cl.
CPC ............ *B60P 7/0876* (2013.01); *Y10T 24/3449* (2015.01); *A44B 99/00* (2013.01); *B60J 11/04* (2013.01); *F16B 5/0685* (2013.01); *D06N 2209/142* (2013.01); *D06N 2201/0263* (2013.01); *D06N 2209/1635* (2013.01); *D06N 3/14* (2013.01); *D06N 2209/1692* (2013.01); *D06N 2209/128* (2013.01); *D06N 2209/1678* (2013.01)
USPC ........... 150/154; 150/155; 150/156; 150/157; 150/158; 150/159; 150/160; 150/161; 150/162; 150/163; 150/164; 223/111; 223/85; 223/96; 24/344; 24/488; 24/242; 606/59

(58) Field of Classification Search
CPC ...... B65D 81/3886; B65D 25/34; A61G 5/10; B62D 1/06; E04G 21/30
USPC ................ 150/154–168; 160/23.1, 29, 368.1; 2/322, 68, 175.7; 223/111, 85, 91, 96; 24/132 R, 15, 16 PB, 265 H, 298, 3.12, 24/3.4, 331–346, 435, 455, 458, 501, 502, 24/503, 506, 507–559; 248/231.51, 316.5, 248/320, 505, 535, 541, 61, 69; 296/100.16, 100.818, 136.02–136.04, 296/37.6, 98; 403/188, 322.1, 385, 389, 403/396
See application file for complete search history.

(56) References Cited

U.S. PATENT DOCUMENTS

| | | | | |
|---|---|---|---|---|
| 2,197,310 | A * | 4/1940 | Lincoln | 27/21.1 |
| 2,815,777 | A * | 12/1957 | Iraids | 81/424 |
| 2,963,031 | A * | 12/1960 | Carroll et al. | 135/146 |
| 4,112,951 | A * | 9/1978 | Hulka et al. | 128/831 |
| 4,688,304 | A | 8/1987 | Marcott | |
| D526,559 | S | 8/2006 | Lewis | |
| 7,308,739 | B2 | 12/2007 | Andersen et al. | |
| 7,441,313 | B2 * | 10/2008 | Degen | 24/512 |
| 7,509,713 | B2 | 3/2009 | Lewis | |
| 7,996,963 | B2 | 8/2011 | Cameron | |
| 2009/0110911 | A1 * | 4/2009 | Van Halderen | 428/332 |
| 2009/0188087 | A1 * | 7/2009 | Lewis | 24/488 |
| 2010/0199536 | A1 * | 8/2010 | Knight et al. | 40/606.01 |
| 2010/0258599 | A1 * | 10/2010 | Sugita et al. | 223/96 |
| 2013/0227782 | A1 * | 9/2013 | Marks et al. | 5/417 |

* cited by examiner

*Primary Examiner* — Fenn Mathew
*Assistant Examiner* — Cynthia Collado
(74) *Attorney, Agent, or Firm* — Frank Marino (57) ABSTRACT

A covering system includes a tarp made of an elastic membrane and a plurality of tarp fastening hooks. The fastening hooks allow the elastic membrane to be stretched over valuables and affixed to environmental anchors so that creases and puddle-enabling pockets in the membrane are eliminated. The fastening hooks clamp onto the elastic membrane and hook onto the environmental anchors to cause tension in the membrane. The clamping forces of the tarp fasteners are inherently increased in proportion to the tension in the clamped membrane.

17 Claims, 6 Drawing Sheets

UNIVERSAL COVERING SYSTEM

RELATED APPLICATION

This application is a Continuation of and claims the benefit of U.S. Provisional Application Ser. No. 61/539,074, filed Sep. 26, 2011, the entire teachings of which are incorporated herein by reference.

FIELD OF THE INVENTION

The present invention is related to covers, tarps, cover-retaining fasteners, and covering systems including covers or tarps and cover-retaining fasteners, for use in protecting valuable items against damage from the elements. More specifically, the present invention is related to such a system that is easily and instantly customizable for conformity to and use on a variety of different valuable items.

BACKGROUND

Covering systems are well known and commonly used for protecting valuable items, ranging from vehicles to firewood to payloads, against damage from the elements. Such systems must have the ability to adequately hide the item from dangers from above, such as rain and snow, sunlight, and tree and bird droppings. The system's cover must be waterproof, so that rain cannot pass there-through to dampen the valuable items. The system should best include some anchoring means for remaining in place during the high winds that oftentimes accompany rain and snow.

The most basic prior art covering systems were simple canvas rectangular tarps, which were spread over items and either held down by their own weight or upon which weights were placed to hold them down. Such systems had many drawbacks. For instance, the tarp material was only marginally waterproof, not only prone to allowing water to seep through to dampen the articles, but also prone to being dampened itself so that the tarps would become odorous and laden with mildew during storage. Also, the weighting was only effective for the mildest of winds. And the tarps did not conform to the valuables so that rain collected thereon in puddles that would either eventually seep through to dampen the valuables or would attract breeding mosquitoes.

Later covering systems employed rectangular reinforced polyethylene tarps having perimetrically distributed metal or plastic eyelets through which ropes or elastic bungee cords would be attached for securing the tarp over or around the valuables. Drawbacks of such tarping systems were also many. For instance, the eyelets were only positioned around the rectangular perimeter of the tarp and were most often not useful in properly securing the tarp over non-rectangular valuables, leaving areas uncovered or having eyelets in locations that could not be used for effective securement. These non-elastic tarps also did not conform to the valuables so that rain would collect thereon.

Tarp fastening clips are more recent to the prior art. These are intended to grasp the tarp material anywhere thereon and provide means for securing that area of the tarp to or over the valuable item. Such clips are typified in U.S. Pat. Nos. 7,308,739, 7,996,963, 4,688,304, 7,509,713, and D526,559. Such clips typically employ both means for grasping the tarp, and means for being secured to another object by rope or such. While overcoming some of the drawbacks of previous tarping systems, these clips are found lacking in convenience and functionality. For instance, no such clip has been found adequate for securing tarps to the wide variety of tie-down means provided in pick-up truck beds. No clip has been found which adequately grasps the double-layer of a folded-over tarp, and no clip has been found which inherently increases its grasping force according to an increase in tarp tension. And tarping systems employing such clips with such prior art tarps are found still prone to the remaining drawbacks.

Other problems typically found in prior art systems include permanent creasing formed at folds during storage which are unsightly and promote additional puddling during use. And the non-elastic materials used in prior art tarps are prone to tearing, puncture, and failure and are not reliably mended. Even though expected to sustain direct exposure to the elements, prior art tarps are prone to aging from sun light and weathering. And prior art tarps are not machine washable.

There exists a need for improvement in covering systems, and such is an object of the present invention. There exists a need for a single covering system adaptable for covering a diversity of items to protect them from the elements, and such is an object of the present invention. There exists a need for such a covering system which is easy to use, durable, dependable, and adaptable, and such are objects of the present invention. There exists a need for such a covering system that adequately secures the tarp to the wide variety of tie-down means provided in pick-up truck beds, and such is an object of the present invention. There exists a need for such a covering system having a fastening clip that adequately grasps the double-layer of a folded-over tarp, and such is an object of the present invention. There exists a need for such a covering system having a fastening clip that inherently increases its grasping force according to an increase in tarp tension, and such is an object of the present invention. There exists a need for such a covering system that is waterproof without promoting puddling, and such is an object of the present invention. There exists a need for such a covering system that remains dry and stores compactly, and such is an object of the present invention. There exists a need for such a covering system that does not form creases at folds during storage, and such is an object of the present invention. There exists a need for such a covering system that is resistant to tearing, puncture, and failure and is easily and reliably mended, and such is an object of the present invention. There exists a need for such a covering system that withstands prolonged exposure to the sun and other elements, and such is an object of the present invention. There exists a need for such a covering system whose tarp is machine washable, and such is an object of the present invention.

Further needs and objects exist which are addressed by the present invention, as may become apparent by the included disclosure of an exemplary embodiment thereof.

SUMMARY OF THE INVENTION

The present invention may employ or be embodied in an object-covering tarp in the form of a contiguous elastic textile membrane that is universally conformable to virtually any object. The present invention may employ or be embodied in a tarp fastening clip in the form of a clamp hook that is capable of securely and simply grasping a tarp at any location thereon and is adaptable for fastening the tarp to virtually any grounding means. The present invention may employ or be embodied a tarping system that includes both such a tarp and such a fastening clip.

The invention may be embodied in or practiced by the combination of a tarp and a plurality of tarp fasteners, each tarp fastener having a hook portion connected to a clamp portion. The clamp portion may have a base and pair of jaws, each jaw having a clamp face and a hinge axis parallel thereto.

Each jaw may be connected to the base at an associated one of the hinge axes and pivotal there-about between an open jaw mode wherein the clamp faces are separated and a closed jaw mode wherein the clamp faces abut on a clamping plane parallel to and equidistant from each hinge axis. The jaws may both be biased to the closed jaw mode. The hinge axes may be more distant from the hook portion than the clamp faces.

The tarp may include a first elastic panel having a first elastic waterproofing layer laminated to a first elastic base fabric. The first elastic waterproofing layer may be polyurethane rubber and may have a minimum resilient elongation of two hundred percent. The first elastic base fabric may be polyester or nylon and may have a minimum resilient elongation of sixty five percent in both warp and weft.

The tarp fasteners may each be clampable to any chosen location about the tarp to dispose the associated hook portion at the chosen location, and increased pulling tension applied to the hook portion of each fastener may cause increased clamping pressure by the clamp portion thereof.

The invention may also be embodied in or practiced by a tarp fastener comprising a hook portion connected to a clamp portion, the clamp portion having a base and pair of jaws; each jaw comprising a clamp face and a hinge axis parallel thereto.

Each jaw may be connected to the base at an associated one of the hinge axes and pivotal there-about between an open jaw mode wherein the clamp faces are separated and a closed jaw mode wherein the clamp faces abut on a clamping plane parallel to and equidistant from each hinge axis. The jaws may both be biased to the closed jaw mode. The hinge axes may be more distant from the hook portion than the clamp faces.

The hinge axes may lie on a hinge plane perpendicular to the clamping plane. The hook portion and clamp portion may be connected at a swivel joint such that the hook portion is pivotal relative to the clamping portion. The swivel joint may have a rotational axis lying on the clamping plane such that the hook portion is pivotal relative to the clamping portion on the clamping plane.

The tarp fastener may also have one or more springs disposed between the base and each jaw for biasing each jaw towards the closed jaw mode. The tarp fastener may also have a pair of separated jaw actuators, each rigidly connected to an associated one of the jaws and movable therewith and adapted when the actuators are squeezed together to cause the jaws into the open jaw mode.

The base may include a yoke having left and right arms straddling the jaws and the hinge axes may both extend between the left and right arms.

The invention may also be embodied in or practiced by a tarp comprising a first elastic panel having a first elastic waterproofing layer laminated to a first elastic base fabric. The first elastic waterproofing layer may be polyurethane rubber and may have a minimum resilient elongation of two hundred percent. The first elastic base fabric may be polyester or nylon and may have a minimum resilient elongation of sixty five percent in both warp and weft. The tarp may have a similar a second elastic panel and the first and second elastic panels may be connected at a seam. The seam may be a linear joint of abutted associated edges of the first and second panels in the same lamination orientation with a strip of polyurethane tape over and hot-pressed along the linear joint to the waterproofing layers, and a bead of elastic glue applied over and along the linear joint to the base fabrics. The may have a perimetrical folded-over hem having the fabric layers internal thereto and sewn with thread in an elastic zig-zag stitch.

Further features and aspects of the invention are disclosed with more specificity in the Detailed Description and Drawings of an exemplary embodiment provided herein.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
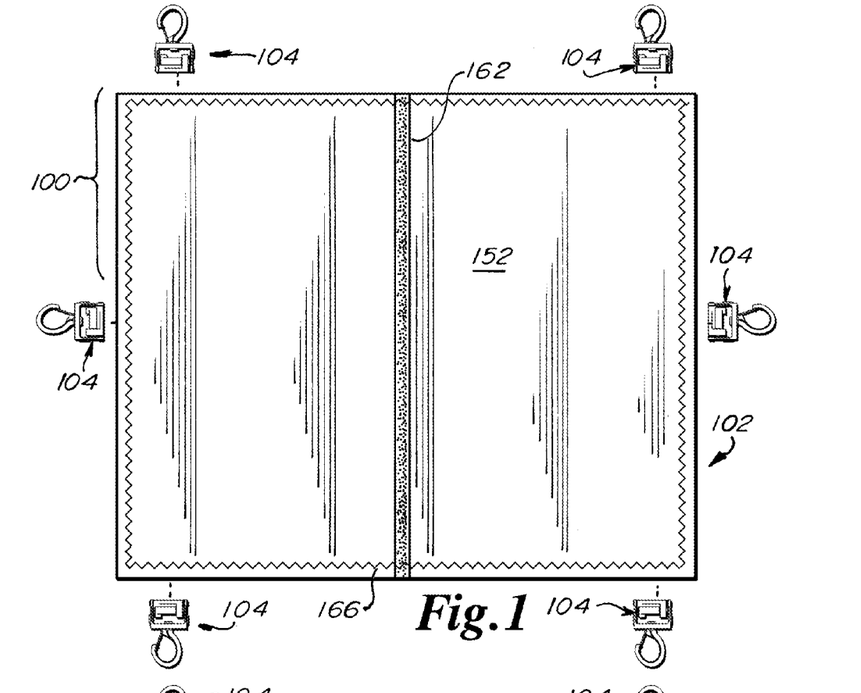
FIG. 1 is an exploded plan view according to an exemplary cover system, including a tarp and six fastening clips all together and independently in accordance with or for use in practicing the invention.
Figure 2:
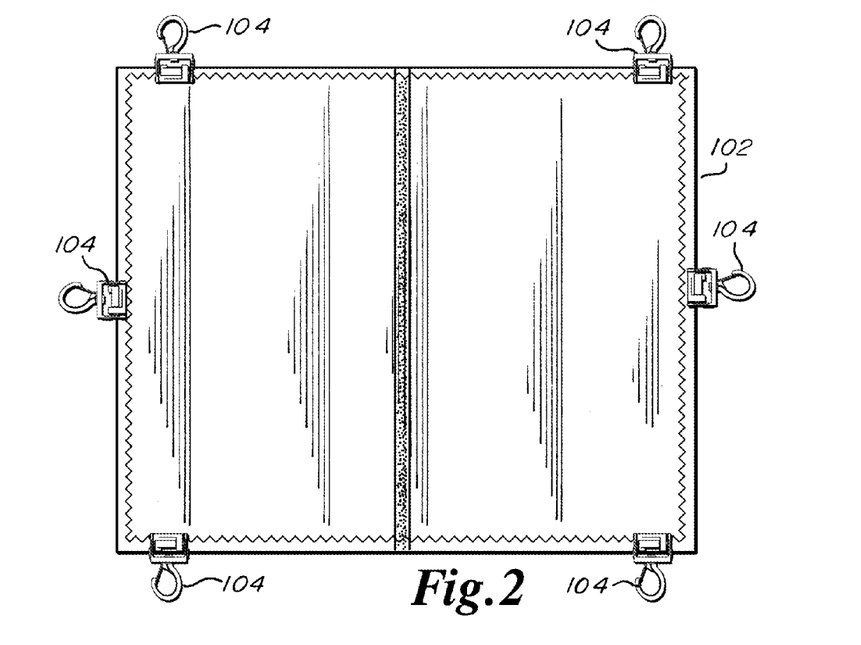
FIG. 2 is an assembled plan view of the cover system of FIG. 1.
Figure 3:
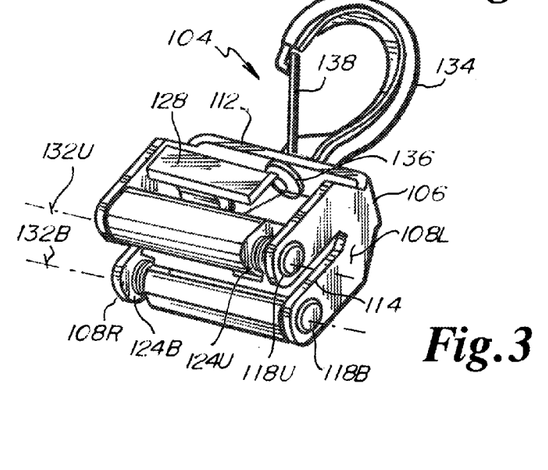
FIG. 3 is a perspective view of a fastening clip of the cover system of FIG. 1.
Figure 7:
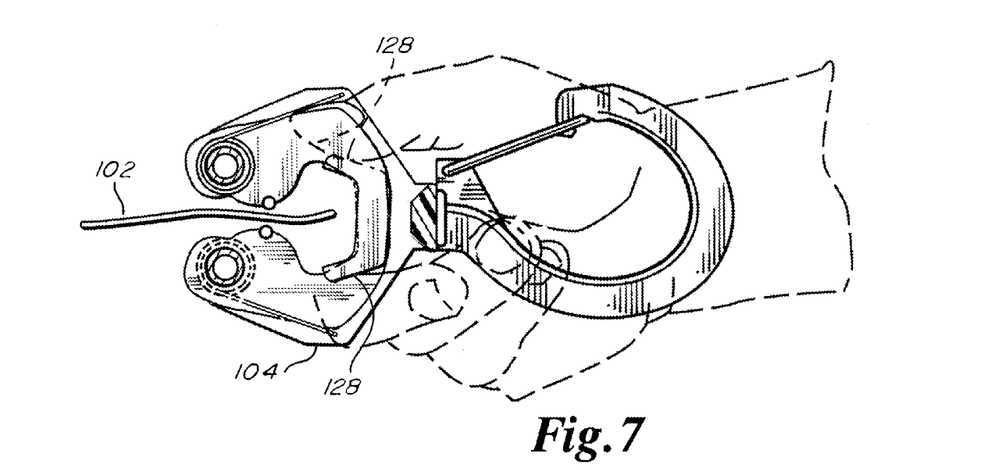
FIG. 7 is a cross-sectional side view of the fastening clip of FIG. 3 in the open jaw mode.
Figure 8:
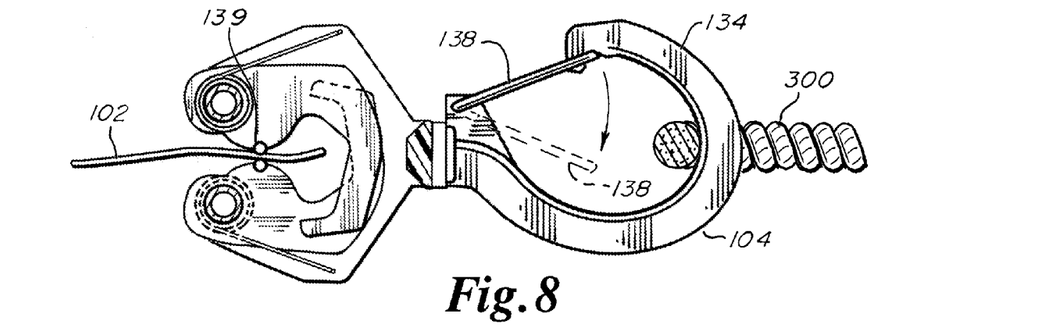
FIG. 8 is a cross-sectional side view of the fastening clip of FIG. 3 in the closed jaw mode and clamping an edge of the tarp of the cover system of FIG. 1.
Figure 11:
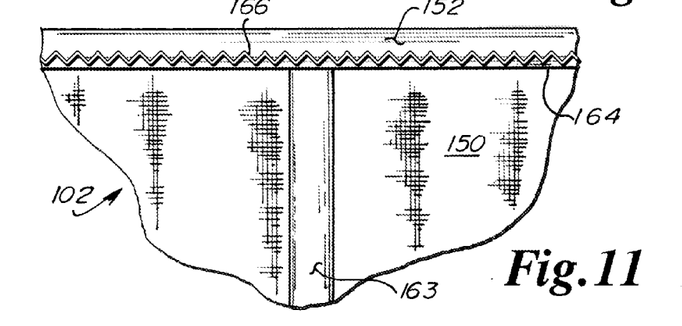
FIG. 11 is a partial view of the hemmed edge of the tarp of the cover system of FIG. 1 in its relaxed state.
Figure 12:
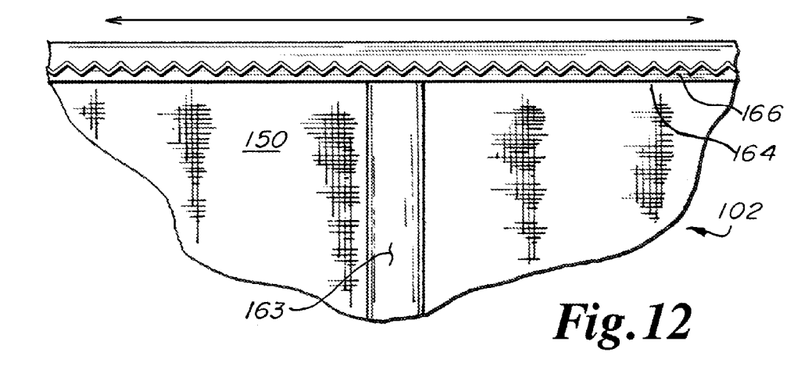
FIG. 12 is a partial view of the hemmed edge of the tarp of the cover system of FIG. 1 in its stretched state.
Figure 19:
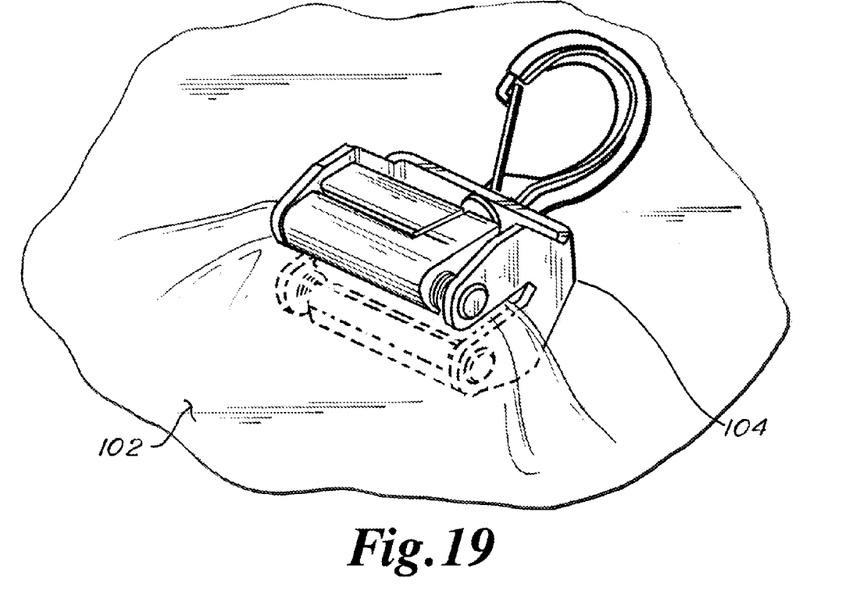
FIG. 19 is a perspective view of the fastening clip of FIG. 3 in the closed jaw mode and clamping a central portion of the tarp of the cover system of FIG. 1.
Figure 20:
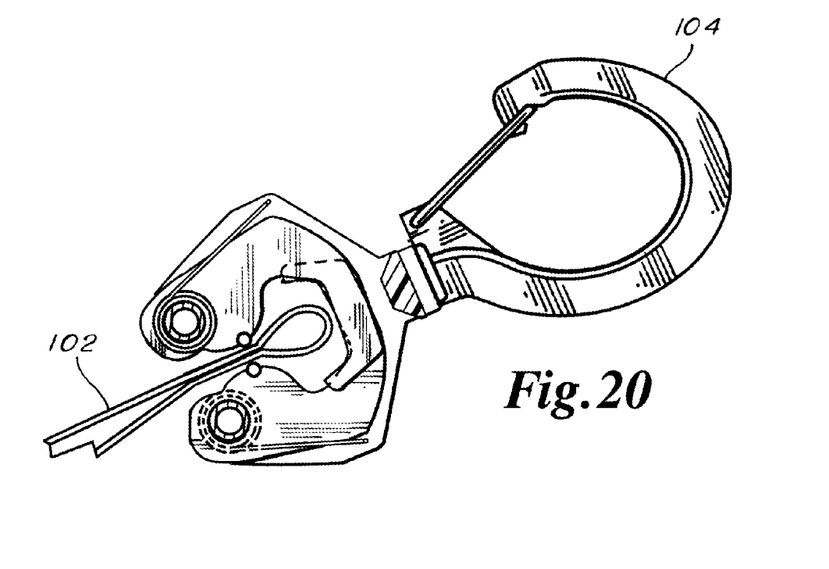
FIG. 20 is a cross-sectional side view of the fastening clip of FIG. 3 in the closed jaw mode and clamping a central portion of the tarp of the cover system of FIG. 1.
Figure 21:
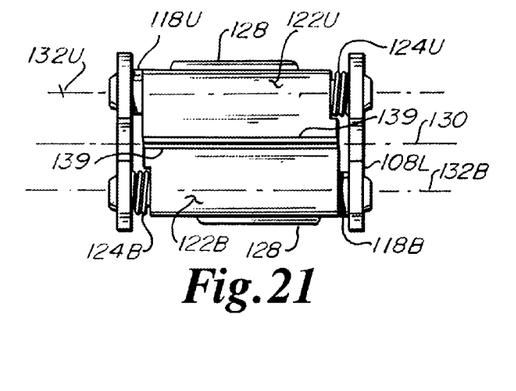
FIG. 21 is a clamp-end view of the fastening clip of FIG. 3.

Reference is now made to FIGS. 1 through 21, where there is shown a universal and adaptable covering system 100 consisting of a tarp exemplified by contiguous elastic textile membrane 102 and six fasteners exemplified by clamp hooks 104. The membrane is composed of a textile laminate formulated to be waterproof and having substantial and resilient four-way stretch capabilities to enable the cover to be used in outdoor environments to protect objects of various shapes as sizes from precipitation and sun exposure while avoiding puddle-enabling pockets and sags. The clamp hooks are designed to allow attachment at any place on the membrane, such as at an edge as seen in FIGS. 2 and 8, or centrally on the tarp as seen in FIGS. 19 and 20, and include a clamping mechanism that increases clamping pressure as tarp tension is increased.

The clamp hooks 104 are shown in more detail in FIGS. 3 through 10 and 21. Each clamp hook includes a base 106 in the shape of a yoke. The base is preferably made of glass-filled nylon, but could be made of any polymer of suitable mechanical properties or of metal. The base has a right side plate 108R parallel to and spaced apart from a left side plate 108R and rigidly connected thereto by an inter-extending base plate 112. Each side plate includes a clearance slot 114 for receiving the tarp.

An upper hole 116U and a lower hole 116B are disposed above and below the slot, respectively, of each side plate. Upper holes 116U together receive steel upper hinge pin 118U and lower holes 116B together receive steel lower hinge pin 118B. Upper jaw 122U is pivotally supported between the upper holes and between the side plates by upper hinge pin 118U and identical but oppositely oriented lower jaw 122B is pivotally supported between the lower holes and between the side plates by lower hinge pin 118B. Upper torsional spring 124U acts between the base and the upper jaw to rotationally bias the upper jaw and lower torsional spring 124B acts between the base and the lower jaw to rotationally bias the upper jaw, as will be later explained in more detail.

Figure 6:
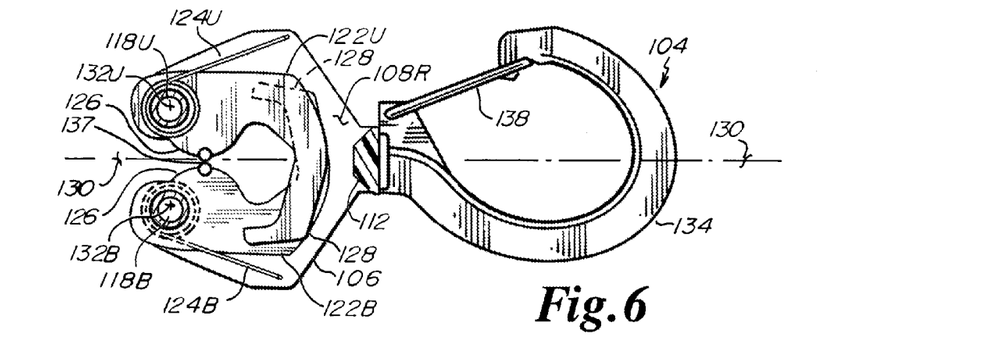
FIG. 6 is a cross-sectional side view of the fastening clip of FIG. 3 in the closed jaw mode.

Referring to FIG. 6, each of the preferably polymer jaws includes a cammed clamping portion 126 and a jaw actuator 128 in a single unitary structure. As such, the cammed clamping portions and activators rotate about the associated hinge pins as the associated jaws rotate, and the actuators are each disposed opposite the hinge pins from the associated clamping portion such that squeezing the actuators inwardly together against the bias of the springs causes the clamping portions to spread relative to each other, as seen in FIG. 7. This will be referred to as the "open jaw mode". Conversely, releasing the actuators allows the springs to return the jaws to their natural state and bias the clamping portions together with considerable clamping force, as seen in FIG. 8. This will be referred to as the "closed jaw made".

FIG. 6 shows the jaws in their natural closed jaw mode. FIG. 7 shows the actuators 128 being forced together to cause the jaws and clamping portions 126 into the open jaw mode, and FIG. 8 shows the jaws and clamping portion again allowed to return to the closed jaw mode to clamp an edge of membrane 102.

Each clamping portion is fitted with a rubber strip 139 to create a clamping edge or clamping face 137, and the clamping edges come into contact with each other on a clamping plane 130 that is parallel to and bisects the hinge pin axes 132U and 132B. The clamping face could also be textured, knurled, or grooved to provide friction when the membrane is clamped to resist slippage of the membrane from the clamped jaws. Slots 114 are at the clamping plane, and when a portion of membrane 102 is received and clamped, that portion is also held on the clamping plane.

Figures 4, 9, 10:
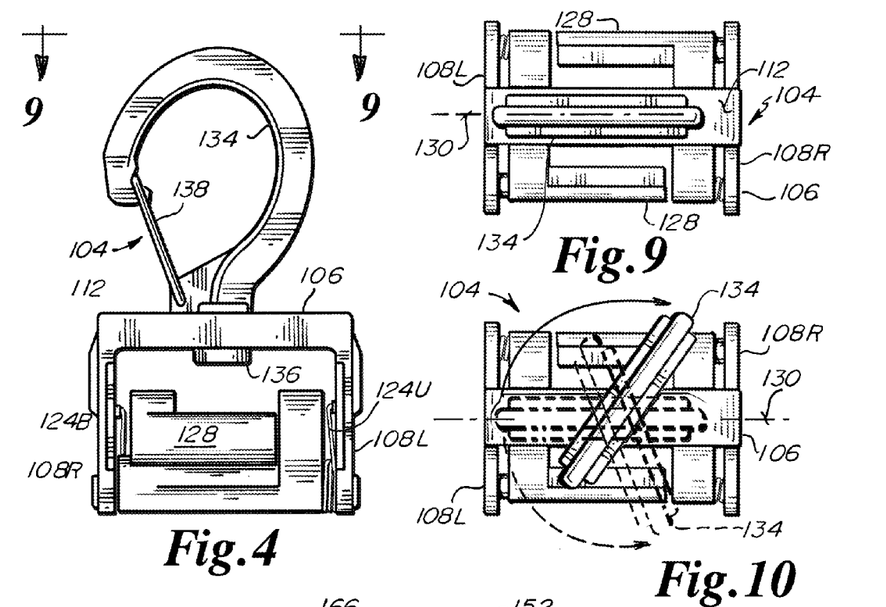
FIG. 4 is a plan view of the fastening clip of FIG. 3.
FIG. 9 is a hook-end view of the fastening clip of FIG. 3 with the hook disposed parallel to the clamping plane.
FIG. 10 is a hook-end view of the fastening clip of FIG. 3 showing the rotation of the hook relative to the clamping plane.
Figure 5:
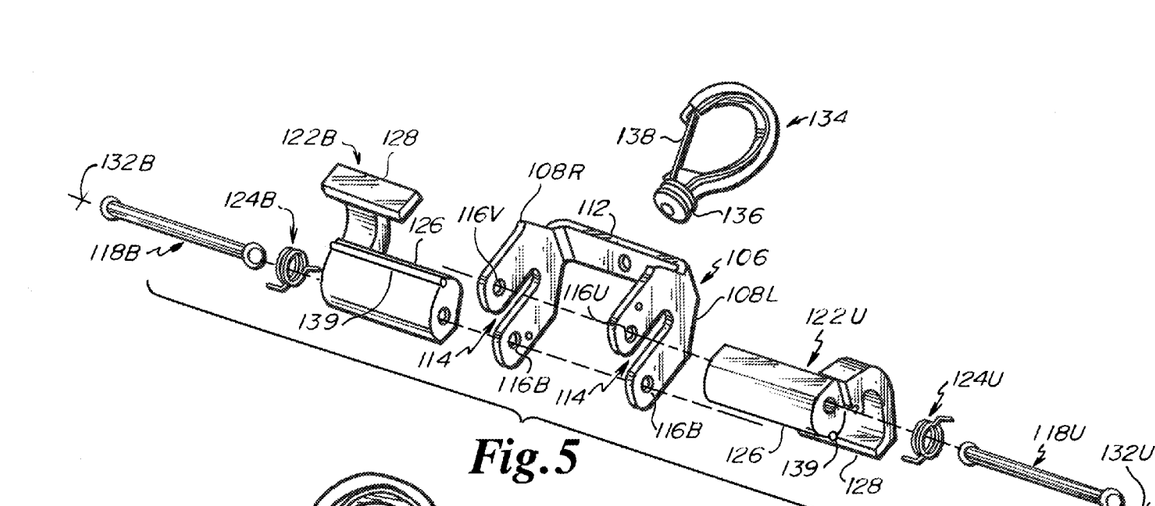
FIG. 5 is an exploded view of the fastening clip of FIG. 3.

A hook 134 is affixed centrally to the base plate by a rotation-enabling swivel joint 136. The hook is intended to enable affixation of the clamp hook to anchoring points and items such as anchor ropes, stakes, eyelets, etc, The swivel joint lies on the clamping plane such that the hook can be rotated about the swivel while remaining at the clamping plane, as shown in FIGS. 9 and 10. The hook is preferably made of glass-filled nylon or some suitable alternative. A spring-biased steel clip 138 is flexed aside manually or by items to be hooked as they are being engaged the hook, and is biased closed to prevent the hooked items from being inadvertently unhooked. The clip is manually flexed aside to allow the items to be intentionally unhooked. Reference is made to FIG. 8, where the clip is flexed to allow the hook to engage a rope 300.

The position of the clamping edges relative to the hinge pin axes and to the hook provides the aforementioned increase in clamping pressure as tension on the clamped tarp is increased. This is best appreciated by referring again to FIG. 8. Tension exerted between membrane 102 and rope 300 pulls the clamping edge 137 towards and between the hinge pin axes 132U and 132B along the clamping plane. This increases the clamping force in the membrane in proportion to the exerted tension. Since this increased clamping force is only realized when the membrane is in tension, clamping force is minimized where and when it is not needed to reduce damage to and permanent indentations and creases in the membrane and prevents inadvertently excessive pressure at the clamping edge from permanently flattening and disfiguring the rubber strip 139.

Membrane 102 is next described, with reference to FIGS. 11 through 16. The membrane predominately consists of an elastic textile or fabric inner layer 150 coated by an elastic waterproof outer layer 152. The textile layer is preferably a polyester fabric having a weight of at least five ounces per yard and a minimum resilient elongation of sixty five percent in both warp and weft. Such a fabric is found to resist abrasion and survive anticipated prolong tension without fatigue. A suitably equivalent nylon fabric may be substituted.

The waterproofing layer is preferably polyurethane rubber with a minimum resilient elongation of two hundred percent. The polyurethane rubber is preferably applied as a coating to the textile layer, but could also be a distinct laminate adhered to the textile layer or could be chemically applied. Such a polyurethane rubber layer is found to remain waterproof through its maximum stretch, and is resistant to degradation from ultra-violet and weather.

The fabric inner layer serves two main purposes. First, because its elongation is less than that of the rubber layer is prevents over stretching of the rubber layer to prevent tearing of the waterproofing as the membrane is stretched. The second purpose is to reduce the chance of the membrane tearing if it gets punctured or comes in contact with a shape edge on the object being covered. The polyester material is found to be more than sufficient to resist anticipated abuses and even excessive wear and tear. Its elongation in both warp and weft, known as four-way stretch, increases the ability of the membrane to conform to most shapes of valuables being covered.

Due to the commonly available widths of the membrane materials, a seam must often be formed to create a tarp of sufficient overall width. The seam must meet or exceed the capabilities of the membrane. Such a seam and the process for creating it are shown in FIGS. 13 through 16.

Figure 13:
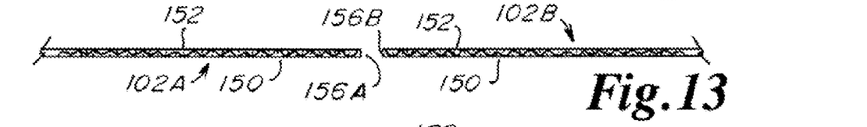
FIG. 13 is a partial cross-sectional view of the first step of making a seam of the tarp of the system of FIG. 1.
Figure 14:
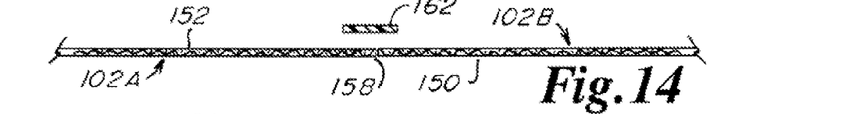
FIG. 14 is a partial cross-sectional view of the second step of making the seam of FIG. 13.
Figure 15:
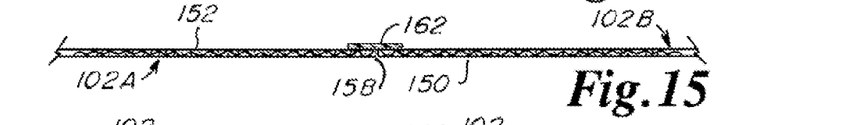
FIG. 15 is a partial cross-sectional view of the third step of making the seam of FIG. 13.
Figure 16:
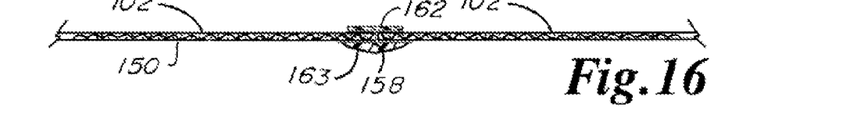
FIG. 16 is a partial cross-sectional view of the fourth step of making the seam of FIG. 13.

Referring to FIG. 13, the seam-making method starts by abutting adjacent edges 156A and 156B of two membrane panels 102A and 102B to create a joint 158. Next, as seen in FIG. 14, a strip of polyurethane rubber tape 162 is laid along the joint on the waterproof layer side 152. Next, the tape is hot-pressed to the waterproof layer to weld the joint together, as seen in FIG. 15. Finally, as shown in FIG. 16, a bead of elastic epoxy 163 is applied to the fabric side 150 of the joint, wiped to minimize its profile, and then cured. When cured, the preferred epoxy has elongation qualities equal to or in excess of those of the fabric.

A similar procedure may be used to mend tears and punctures in the membrane. The four-way universal elongation properties of both the waterproofing and fabric layers are particularly capable of survival though such tears and mends. A hot-pressed patch on the waterproof side of a tear or puncture coupled with a dab of elastic epoxy on the fabric side results in a mend that is substantially equal to the original membrane in all functional attributes. The membrane is also machine washable, resistant to damage from hot water and from most detergents.

The perimeter of the tarp is formed into a stretchable hem 164 by folding approximately one inch over with the fabric side inward, and sewing with a zig-zag stitch 166. As can be seen by comparison of FIGS. 11 and 12, the zig-zag stitch enables full elongation of the membrane. Equivalent elastic stitching arrangements may be substituted.

Figure 17:
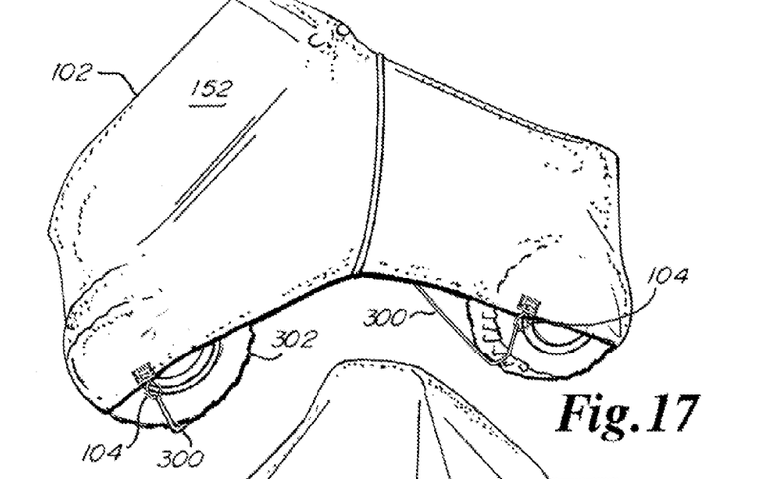
FIG. 17 is a perspective view of the cover system of FIG. 1 covering a wheeled vehicle.
Figure 18:
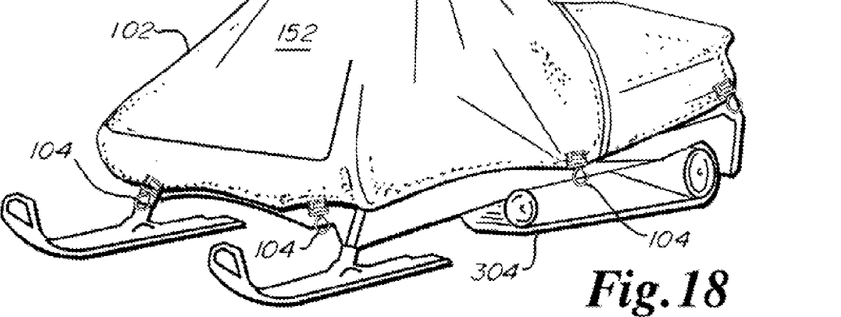
FIG. 18 is a perspective view of the cover system of FIG. 1 covering a snowmobile.

FIGS. 17 and 18 depict typical uses of the covering system 100 and illustrate how it conforms to even the most exotically-shaped valuables. In FIG. 17, the system is used to cover an all-terrain vehicle 302 and in FIG. 18 it is used to cover a snowmobile 304. Tension in the membrane in conjunction with is four-way stretch results in a relatively even tautness and an overall smoothness that eliminates the creases and puddling areas of prior art tarping systems. Additional clamps may be added to any point around the membrane and anchored as necessary to cover the payload. Based on the size of the object being covered the membrane can be folded to the size needed and the clamps hooks will still attach in the same manner.

The clamp hooks are designed to be attached to any location on the membrane to maximize the versatility of the system and the range of valuables that it can effectively cover FIGS. 19 and 20 demonstrate how the clamp hooks may be affixed to central areas of the membrane.

While the invention has been shown and described with reference to a specific exemplary embodiment, it should be understood by those skilled in the art that various changes in form and detail may be made without departing from the spirit and scope of the invention, and that the invention should therefore only be limited according to the following claims, including all equivalent interpretation to which they are entitled.

I claim:

1. A tarp fastener comprising a hook portion connected to a clamp portion;
   the clamp portion comprising a base and pair of jaws;
      each jaw comprising a clamp face and a hinge axis parallel thereto;
      each jaw connected to the base at an associated one of the hinge axes and pivotal there-about between an open jaw mode wherein the clamp faces are separated and a closed jaw mode wherein the clamp faces abut on a clamping plane parallel to and equidistant from each hinge axis;
   wherein the jaws are both biased to the closed jaw mode;
   wherein the hinge axes are more distant from the hook portion than the clamp faces; and
   wherein the hinge axes of both jaws are rigidly and permanently fixed relative to each other and clamping forces between the clamp faces are increased when a pulling force in increased on a tarp clamped there-between along the clamping plane in a direction away from the hook portion.

2. The tarp fastener of claim 1 wherein the hinge axes lie on a hinge plane perpendicular to the clamping plane.

3. The tarp fastener of claim 2 wherein the hook portion and clamp portion are connected at a swivel joint such that the hook portion is pivotal relative to the clamping portion.

4. The tarp fastener of claim 3 wherein the swivel joint has a rotational axis lying on the clamping plane such that the hook portion is pivotal relative to the clamping portion on the clamping plane.

5. The tarp fastener of claim 4 further comprising a spring disposed between the base and each jaw for biasing each jaw towards the closed jaw mode.

6. The tarp fastener of claim 1 further comprising a pair of separated jaw actuators, each rigidly connected to an associated one of the jaws and movable therewith and adapted when the actuators are squeezed together to cause the jaws into the open jaw mode.

7. The tarp fastener of claim 6 wherein the hinge axes lie on a hinge plane perpendicular to the clamping plane.

8. The tarp fastener of claim 7 wherein the hook portion and clamp portion are connected at a swivel joint such that the hook portion is pivotal relative to the clamping portion.

9. The tarp fastener of claim 8 wherein the swivel joint has a rotational axis lying on the clamping plane such that the hook portion is pivotal relative to the clamping portion on the clamping plane.

10. The tarp fastener of claim 9 further comprising a spring disposed between the base and each jaw for biasing each jaw towards the closed jaw mode.

11. The tarp fastener of claim 1 wherein the base comprises a yoke having left and right arms straddling the jaws; and wherein the hinge axes both extend between the left and right arms.

12. The tarp fastener of claim 11 further comprising a pair of separated jaw actuators, each rigidly connected to one of the jaws and movable therewith and adapted when the actuators are squeezed together to cause the jaws into the open jaw mode.

13. The tarp fastener of claim 12 wherein the hinge axes lie on a hinge plane perpendicular to the clamping plane.

14. The tarp fastener of claim 13 wherein the hook portion and clamp portion are connected at a swivel joint such that the hook portion is pivotal relative to the clamping portion about the clamping plane.

15. The tarp fastener of claim 14 wherein the swivel joint has a rotational axis lying on the clamping plane such that the hook portion is pivotal relative to clamping portion on the clamping plane.

16. The tarp fastener of claim 15 further comprising a spring disposed between the base and each jaw for biasing each jaw towards the closed jaw mode.

17. In combination, a tarp and a plurality of tarp fasteners:
   each tarp fastener comprising a hook portion connected to a clamp portion;
      the clamp portion comprising a base and pair of jaws;
         each jaw comprising a clamp face and a hinge axis parallel thereto;
         each jaw connected to the base at an associated one of the hinge axes and pivotal there-about between an open jaw mode wherein the clamp faces are separated and a closed jaw mode wherein the clamp faces abut on a clamping plane parallel to and equidistant from each hinge axis;
      wherein the jaws are both biased to the closed jaw mode;
      wherein the hinge axes are more distant from the hook portion than the clamp faces; and wherein the hinge axes of both jaws are rigidly and permanently fixed relative to each other and clamping forces between the clamp faces are increased when a pulling force in increased on a tarp clamped therebetween along the clamping plane in a direction away from the hook portion; and the tarp comprising a first elastic panel having a first elastic waterproofing layer laminated to a first elastic base fabric; wherein the first elastic waterproofing layer comprises polyurethane rubber and has a minimum resilient elongation of two hundred percent; and the first elastic base fabric is from the group including polyester and nylon and has a minimum resilient elongation of sixty five percent in both warp and weft; and wherein the tarp fasteners are each clampable to any chosen location about the tarp to dispose the associated hook portion at the chosen location, and increased pulling tension applied to the hook portion of each fastener causes increased clamping pressure by the clamp portion thereof.

\* \* \* \* \*